May 23, 1950
J. R. DEWAR
OVERLOAD PROTECTION ARRANGEMENT FOR HARMONIC CONVERTERS
Filed Jan. 1, 1945
2,508,907
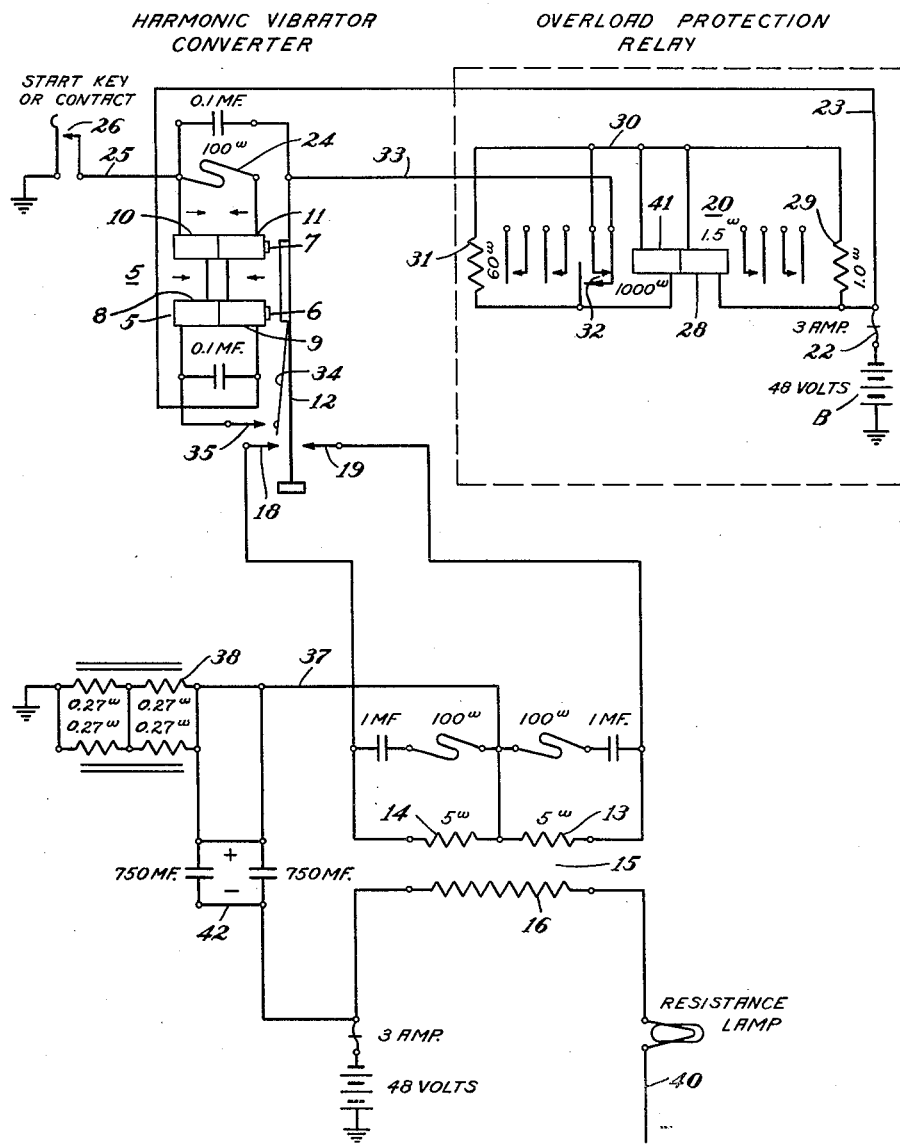
INVENTOR.
JAMES R. DEWAR
BY
D. Clyde Jones
ATTORNEY Patented May 23, 1950

2,508,907

UNITED STATES PATENT OFFICE 2,508,907

OVERLOAD PROTECTION ARRANGEMENT FOR HARMONIC CONVERTERS

James R. Dewar, Rochester, N. Y., assignor to Stromberg-Carlson Company, Rochester, N. Y., a corporation of New York Application January 1, 1945, Serial No. 571,008

5 Claims. (Cl. 321—18)

This invention relates to an overload protection arrangement for harmonic converters of the vibrator type such as are used to provide ringing current of the proper frequency to ring the harmonically tuned ringers at the several party line substations of a telephone system.

Considerable trouble has been experienced in service with harmonic vibrator type converters, due to excessive arcing at the vibrator contacts and due to the frequent destruction of protective fuses in the direct current supply to the primary portion of the converter. The main feature of the present invention, therefore, relates to a novel circuit arrangement which in large part obviates the mentioned troubles.

Another feature of the invention relates to the provision of means which prevents any substantial change in the resistance of the motoring circuit of the converter during periods of overload so that the speed of the converter is not altered and the frequency of the current will not change to cause cross-ringing of the ringers tuned to other frequencies.

The drawing diagrammatically illustrates a harmonic vibrator converter and the overload protection arrangement therefor.

The harmonic vibrator converter, as used in telephone systems for ringing a tuned ringer on a party line, includes a magnet generally designated 5 comprising spaced cores 6 and 7. The core 6 is provided with differentially wound coils 8, 9 and the core 7 is provided with differentially wound coils 10 and 11. The magnet 5, when energized, attracts a tuned vibrator pendulum 12 which not only interrupts the motor circuit of the magnet 5, as will be described, but also alternately interrupts the energizing circuits of the primary windings 13 and 14 of a transformer 15. The secondary winding 16 of this transformer is adapted to be connected in a ringing circuit including the ringer at a called substation (not shown). It will be understood that the pendulum 12 is tuned to a given frequency, for example, sixteen and two-thirds cycles. However, it will be further understood that a similar converter is provided for each other ringing frequency used in the telephone system, for example, twenty-five cycles, thirty-three and one-third cycles, fifty cycles and sixty-six and two-thirds cycles.

When a converter such as the one illustrated is in operation, the pendulum 12 alternately engages the contacts 18 and 19 to close and open the primary windings 13 and 14 of the ringing transformer 15. By way of example, these primary windings may each have a direct current resistance of about 5 ohms. If the load does not exceed the rated capacity of the converter and spacing of contacts 18 and 19 is properly adjusted, hardly any arcing at these contacts is observed. However, when an excessive load is encountered or a short circuit occurs, the impedance of the circuit including the secondary winding 16 of the ringing transformer is lowered considerably, causing a heavy current drain in the circuits of the primary windings 13 and 14.

In accordance with the present arrangement, there is provided an overload protection arrangement including a relay 20 which operates when loads exceeding the safe maximum power output of the converter are reached. When the overload protection relay is operated, an impedance is inserted in the negative battery supply to the vibrator pendulum, as will be described, thereby causing a voltage drop in the primary circuit of the transformer 15 and a corresponding drop in the secondary circuit of this transformer.

During normal operation of the converter, current is supplied for operating the pendulum from the battery B, fuse 22, conductor 23, motor coils 9 and 11, resistor 24, conductor 25 and start key 26, to ground. Under the control of this circuit, the pendulum 12 swings to the left and thereby closes a circuit from the battery B, fuse 22, low resistance winding 28 of the overload protection relay 20 and in multiple therewith, the low value resistor 29, conductor 30, through the make-before-break contacts 32, conductor 33, pendulum 12, and contacts 34 and 35, through the left hand coils 8 and 10, conductor 25, key 26, to ground. As previously mentioned, the pairs of coils 8, 9 and 10, 11 are differentially connected. Thus, when both pairs of these coils are energized, as just described, the coils of each pair counteract each other so that the pendulum 12 swings to the right to engage the contact 19.

While the pendulum 12 was in its left hand position in engagement with the contact 35, current flowed in the circuit extending from battery B, fuse 22 and through the resistor 29 and the overload relay winding 28 in multiple, conductor 30, make-before-break contacts 32, conductor 33, to the pendulum 12. From the pendulum, the circuit extends through the primary winding 14, conductor 37, to ground through the noise reducing filter comprising the series-parallel-connected inductance unit 38. The parallel-connected condensers 42 provide a by-pass filter and tend to maintain a constant potential at the primary transformer midtap. The temporary flow of current in the circuit just described, induces a current in one sense in the secondary winding 16 of the transformer 15. When the pendulum 12 swings to the right into engagement with the contact 19, a circuit for the primary winding 13 of the transformer is completed. This circuit is similar to that of primary winding 14 of the transformer but differs therefrom in that from the pendulum 12 this circuit extends through contact 19, primary winding 13, conductor 37, inductor unit 38, to ground. Current in this circuit induces in the secondary winding 16, a current of opposite sense from that induced therein by current in primary winding 14. It will be understood that the pendulum 12 is tuned so that it will alternately make and break the circuits of the primary windings 13 and 14 at such frequency that current of the desired frequency is induced in the secondary winding 16 of the ringing transformer.

Under normal operation of the converter, as set forth above, the forty-eight volt battery from source B is supplied to the pendulum 12 through the one and a half ohm winding 28 of the overload protection relay 20 and the one ohm resistor 29 in multiple therewith and thence through the make-before-break contacts 32 of relay 20. If the load does not exceed the rated capacity of the converter, and the vibrator contact spacing is properly adjusted, scarcely any arcing will be observed at the vibrator contacts 18 and 19.

When, however, an excessive load is encountered in the ringing circuit including conductor 40, the impedance of the circuit including the secondary winding of the ringing transformer is reduced considerably thereby causing a heavy current drain in the primary circuit of the transformer. As a result of this heavy current drain, the relay 20 operates and thereby includes in series with its winding 28, both its thousand ohm winding 41 as well as the sixty ohm resistor in multiple therewith. This added resistance plus the heavy load, causes the direct current voltage at the vibrator pendulum 12 to drop, thereby affording protection to fuse 22 and the alternating current voltage in the secondary or output winding 16 of the ringing transformer 15 to drop almost to zero. This quenches any arcing that may have started at the vibrator contacts. The motor coils 9 and 11 of the converter, being isolated from the pendulum load circuit, continue to drive the vibrator at approximately normal speed. Thus the converter frequency is maintained uniform during those periods that the over-load protection relay is operated, so that when this relay releases, cross-ringing will not result because of changing frequency of the ringing current. It will be understood that when the cause of the overload condition is removed, the overload protection relay 20 automatically releases so that normal operation of the harmonic converter is restored.

What I claim is:

1. In a system for converting direct current into alternating current and for utilizing said alternating current to energize an electrical load having a variable impedance, a transformer having a primary winding and a secondary winding, a vibrating pole-changer, an intermittently energized circuit including vibrating contacts on said pole-changer for causing said direct current to flow intermittently in said primary winding whereby alternating current is produced in said secondary winding to which said load is connected, a resistance element, and means responsive to an increase of alternating current flow in said secondary winding beyond a predetermined value for including said resistance element in said primary winding, said last mentioned means including said intermittently energized circuit.

2. In a system for converting direct current into alternating current and for utilizing said alternating current to energize an electrical load having a variable impedance, a transformer having a primary winding and a secondary winding, a relay having a low impedance winding and a comparatively high impedance winding, means for causing said direct current to flow intermittently in said low impedance winding and said primary winding whereby alternating current is produced in said secondary winding to which said load is connected, and means including said relay responsive to an increase of alternating current flow in said secondary winding beyond a predetermined value for transferring said direct current flow from said low impedance winding to said high impedance winding.

3. In a system for converting direct current into alternating current and for utilizing said alternating current to energize an electrical load having a variable impedance, a transformer having a primary winding and a secondary winding, a relay having a low impedance winding and a comparatively high impedance winding, means for causing said direct current to flow intermittently in said low impedance winding and said primary winding whereby alternating current is produced in said secondary winding to which said load is connected, make before break contacts on said relay, and means including said contacts for substituting said high impedance winding for said low impedance winding when the impedance of said load is reduced beyond a certain predetermined value.

4. In a system for converting direct current into alternating current and for utilizing said alternating current to energize an electrical load having a variable impedance, a transformer having a pair of primary windings and a secondary winding, a first circuit including a source of direct current and a regulator for energizing one of said primary windings to produce voltage of one polarity across said secondary winding, a second circuit including said source of direct current and said regulator for energizing the other of said primary windings to produce voltage of opposite polarity across said secondary winding, a control-device including contacts for alternately completing said first and said second circuits whereby alternating voltage is developed across said secondary winding, and means for operating said regulator when said secondary winding is connected to a load of low impedance or short-circuited whereby the current traversing said first and said second windings is limited.

5. In a system for converting direct current into alternating current and for utilizing said alternating current to energize an electrical load having variable impedance, a transformer having a pair of primary windings and a secondary winding, a first circuit including a source of direct current and a relay for energizing one of said primary windings to produce voltage of one polarity across said secondary winding, a second circuit including said source of direct current and said relay for energizing the other of said primary windings to produce voltage of opposite polarity across said secondary winding, a control device including contacts for alternately completing said first and said second circuits whereby alternating voltage is developed across said secondary winding, means for operating said relay when said secondary winding is connected to a load of low impedance or short-circuited, and means including contacts controlled by the operation of said relay for limiting the current in said first and said second windings.

JAMES R. DEWAR.

REFERENCES CITED

The following references are of record in the file of this patent:

UNITED STATES PATENTS

| Number | Name | Date |
|---|---|---|
| 294,669 | Pope | Mar. 4, 1884 |
| 1,543,671 | Hinrichsen | June 30, 1925 |
| 1,709,757 | Von Olsen | Apr. 10, 1929 |
| 1,753,921 | Edelman | Apr. 8, 1930 |
| 1,834,832 | Flandrin et al. | Dec. 1, 1931 |
| 2,020,681 | Garstang | Nov. 12, 1935 |
| 2,036,399 | Comstock et al. | Apr. 7, 1936 |
| 2,200,064 | James | May 7, 1940 |
| 2,225,687 | Cox | Dec. 24, 1940 |
| 2,338,079 | Huge | Dec. 28, 1943 |
| 2,442,737 | Walker | June 1, 1948 |

FOREIGN PATENTS

| Number | Country | Date |
|---|---|---|
| 30,936 | Denmark | Dec. 4, 1922 |